US009062183B2

(12) United States Patent
Markgraf et al.

(10) Patent No.: US 9,062,183 B2
(45) Date of Patent: Jun. 23, 2015

(54) FIBER REINFORCED POLYOXYMETHYLENE COMPOSITION WITH IMPROVED THERMAL PROPERTIES

(71) Applicant: Ticona GmbH, Sulzbach (DE)

(72) Inventors: Kirsten Markgraf, Weinheim (DE); Ursula Ziegler, Mainz-Kostheim (DE)

(73) Assignee: Ticona GmbH, Sulzbach (DE)

( * ) Notice: Subject to any disclaimer, the term of this patent is extended or adjusted under 35 U.S.C. 154(b) by 0 days.

(21) Appl. No.: 14/136,119

(22) Filed: Dec. 20, 2013

(65) Prior Publication Data

US 2014/0179865 A1 Jun. 26, 2014

Related U.S. Application Data

(60) Provisional application No. 61/739,884, filed on Dec. 20, 2012.

(51) Int. Cl.
*C03C 25/26* (2006.01)
*C08K 3/40* (2006.01)
*C08J 5/04* (2006.01)
*C08J 5/10* (2006.01)
*C08K 5/29* (2006.01)
*C08K 7/14* (2006.01)

(52) U.S. Cl.
CPC . *C08K 3/40* (2013.01); *C08J 5/043* (2013.01); *C08J 5/10* (2013.01); *C08K 5/29* (2013.01); *C08K 7/14* (2013.01); *C08J 2359/00* (2013.01)

(58) Field of Classification Search
CPC .............. C08K 7/14; C08K 7/02; C08K 9/04; C08K 5/29; C08J 5/04; C08J 5/043; C08J 5/08; C08L 59/00; C08L 59/02; C08L 59/04
USPC .......................................... 524/593, 494, 492
See application file for complete search history.

(56) References Cited

U.S. PATENT DOCUMENTS

| | | | |
|---|---|---|---|
| 3,455,867 A * | 7/1969 | Bates et al. | 524/196 |
| 3,574,786 A | 4/1971 | Ishida et al. | |
| 3,901,846 A | 8/1975 | Freed | |
| 3,985,661 A | 10/1976 | Ikeda et al. | |
| 4,070,415 A | 1/1978 | Sextro et al. | |
| 4,469,842 A * | 9/1984 | Kritchevsky | 524/593 |
| 4,480,071 A * | 10/1984 | Natarajan et al. | 524/593 |
| 4,493,751 A | 1/1985 | Cherdron et al. | |
| 4,578,422 A * | 3/1986 | Sakurai et al. | 524/593 |
| 4,652,594 A | 3/1987 | Auerbach et al. | |
| 4,670,508 A | 6/1987 | Ohdaira et al. | |
| 4,780,508 A | 10/1988 | Cunningham et al. | |
| 4,828,755 A | 5/1989 | Kusumgar et al. | |
| 4,929,712 A | 5/1990 | Sugiyama et al. | |
| 5,156,913 A | 10/1992 | Collins et al. | |
| 5,326,846 A | 7/1994 | Nagai et al. | |
| 5,344,875 A | 9/1994 | Niino | |
| 5,393,813 A | 2/1995 | Schauhoff et al. | |
| 5,446,086 A | 8/1995 | Sugiyama et al. | |
| 5,478,895 A | 12/1995 | Sugiyama et al. | |
| 5,530,061 A | 6/1996 | Sanada et al. | |
| 5,866,256 A | 2/1999 | Izumitani et al. | |
| 5,942,568 A | 8/1999 | Niino et al. | |
| 6,077,908 A | 6/2000 | Yahiro | |
| 6,130,280 A * | 10/2000 | Yokoyama et al. | 524/404 |
| 6,211,268 B1 | 4/2001 | Matsumura et al. | |
| 6,238,733 B1 | 5/2001 | Therolf | |
| 6,271,302 B1 | 8/2001 | Matsushima | |
| 6,388,049 B1 * | 5/2002 | Yokoyama et al. | 528/425 |
| 6,936,651 B2 | 8/2005 | Flexman et al. | |
| 7,169,887 B2 | 1/2007 | Papke | |
| 7,943,726 B2 | 5/2011 | Haubs et al. | |
| 8,008,390 B2 * | 8/2011 | Gunnewig et al. | 524/500 |
| 8,178,479 B2 | 5/2012 | Cernohous | |
| 8,318,866 B2 | 11/2012 | Kurz | |
| 8,829,085 B2 | 9/2014 | Markgraf et al. | |
| 2005/0043492 A1 | 2/2005 | Chin et al. | |
| 2005/0107513 A1* | 5/2005 | Papke | 524/494 |
| 2005/0222303 A1 | 10/2005 | Cernohous | |
| 2006/0058457 A1 | 3/2006 | Kawaguchi | |
| 2006/0111473 A1 | 5/2006 | Yuan et al. | |
| 2007/0066746 A1 | 3/2007 | Gunnewig et al. | |
| 2010/0022691 A1 | 1/2010 | Katsuchi et al. | |
| 2010/0056676 A1 | 3/2010 | Hase | |
| 2011/0184098 A1 | 7/2011 | Sunaga et al. | |
| 2012/0157588 A1* | 6/2012 | Markgraf et al. | 524/101 |
| 2013/0102718 A1 | 4/2013 | Markgraf et al. | |
| 2013/0331488 A1 | 12/2013 | Markgraf | |
| 2014/0179865 A1 | 6/2014 | Markgraf et al. | |

FOREIGN PATENT DOCUMENTS

| | | |
|---|---|---|
| CN | 101130621 | 2/2008 |
| CN | 101343396 | 1/2009 |

(Continued)

OTHER PUBLICATIONS

Kawaguchi et al., "Tensile Behavior of Glass-Fiber Filled Polyacetal: Influence of the Functional Groups of Polymer Matrices", Journal of Applied Polymer Science, Wiley, US, vol. 107, No. 1., Jan. 5, 2008, pp. 667-673.
Zhou JianSong et al, "Advance on tribological performance of ultra high molecular weight polyethylene" Journals of Materials and Engineering, vol. 23, No. 1, pp. 142-145.
Deng Wenjuan et al, "Study on tribological properties on PON/HDPE blend", Engineering Plastics Application, vol. 38, No. 6, pp. 54-56.
Search Report and Written Opinion for Application No. PCT/IB2013061235 dated Apr. 16, 2014.
Mehrabzadeh et al. Impact Modification of Polyacetal by Thermoplastic Elastomer Polyurethane. Journal of Applied Polymer Science, vol. 84, 2573-2582 (2002).
GUR ultra-high molecular weight polyethylene. Ticona. Mar. 2001.
JPH0822122 English abstract only.

*Primary Examiner* — Jane L Stanley
(74) *Attorney, Agent, or Firm* — Dority & Manning, P.A.

(57) ABSTRACT

The present disclosure relates to a molding composition and to molded products made from the composition. In accordance with the present disclosure, the polymer composition contains a polyoxymethylene copolymer having a relatively low amount of comonomer units. The polyoxymethylene polymer is combined with at least one reinforcing fiber and a coupling agent. The above polymer produces a composition have a relatively high heat deflection temperature, while also having excellent mechanical properties.

22 Claims, No Drawings

(56) References Cited

FOREIGN PATENT DOCUMENTS

| | | |
|---|---|---|
| CN | 101759955 | 6/2010 |
| CN | 102532798 | 7/2012 |
| CN | 103131124 | 6/2013 |
| DE | 2162345 | 7/1972 |
| EP | 1630198 A1 | 1/2006 |
| GB | 1331829 | 9/1973 |
| JP | 55-145529 | 11/1980 |
| JP | 56-105905 | 8/1981 |
| JP | 3284675 | 12/1991 |
| JP | 6179671 | 6/1994 |
| JP | 7010871 | 1/1995 |
| JP | 7033766 | 2/1995 |
| JP | 07242724 | 9/1995 |
| JP | 11 181232 | 7/1999 |
| JP | 11181231 | 7/1999 |
| JP | 2000154181 | 6/2000 |
| JP | 2000-336241 | 12/2000 |
| JP | 4741120 | 6/2002 |
| JP | 2009-286874 | 12/2009 |
| JP | 2010037445 | 2/2010 |
| JP | 2011246566 | 12/2011 |
| WO | WO 99/46331 | 9/1999 |
| WO | WO 2006/105918 A1 | 12/2006 |
| WO | WO 2010/035351 A1 | 1/2010 |
| WO | WO 2010/073529 | 7/2010 |
| WO | WO 2013/156227 | 10/2013 |

* cited by examiner

FIBER REINFORCED POLYOXYMETHYLENE COMPOSITION WITH IMPROVED THERMAL PROPERTIES

RELATED APPLICATIONS

The present application is based on and claims priority to U. S. Provisional Application Ser. No. 61/739,884 filed Dec. 20, 2012, which is incorporated herein by reference.

BACKGROUND

The superior mechanical properties of polyoxymethylene (POM) molding compositions are the reason for their use in numerous applications. To improve their properties, the polyoxymethylene homo- and -copolymers are provided with additives to adapt the properties to the application, for example by using reinforcing fibers.

Combining reinforcing fibers with a polyoxymethylene polymer, for instance, can improve many physical properties of molded articles made from the polymer composition. For instance, fiber reinforced polyoxymethylene polymers have been shown to have excellent tensile strength, while having a good flex fatigue and creep performance.

A fiber reinforced polyoxymethylene composition, for instance, is disclosed in PCT Publication No. WO2012/049293, which is incorporated herein by reference. In the '293 application, a polyoxymethylene polymer is used that has a relatively high amount of hydroxyl groups. The polyoxymethylene polymer is combined with a coupling agent and at least one reinforcing fiber. The coupling agent is used to improve the compatibility between the polyoxymethylene polymer and the fibers. In the '293 application, a formaldehyde scavenger may optionally be included in the polymer composition for decreasing formaldehyde emissions.

The inventions disclosed in the '293 application have provided great advancements in the art. Compositions made according to the '293 application can have improved mechanical properties while also having low formaldehyde emissions.

The present disclosure is directed to further improvements in fiber reinforced polyoxymethylene polymer compositions and to improved products molded from the composition.

SUMMARY

In general, the present disclosure is directed to a fiber reinforced polyoxymethylene polymer composition that not only has excellent strength properties but also has dramatically improved thermal mechanical properties. In particular, the polymer composition of the present disclosure may be used to mold products that can maintain their physical properties even at higher temperatures. The polymer composition of the present disclosure can also be removed from molds at higher temperatures providing greater throughput when producing products.

In one embodiment, the present disclosure is directed to a polymer composition that comprises a polyoxymethylene polymer. The polyoxymethylene polymer comprises a copolymer containing oxymethylene units and comonomer units, the proportion of comonomer units based on the proportion of oxymethylene units can be between about 0.001% and about 1% by weight, such as from about 0.01% to about 0.7% by weight, such as from about 0.05% to about 0.5% by weight. On a molar basis, the comonomers units can be present in an amount from about 0.001 mol % to about 0.7 mol %, such as from about 0.01 mol % to about 0.5 mol %.

The polymer composition further contains at least coupling agent, at least one reinforcing fiber, and optionally a formaldehyde scavenger.

In one embodiment, the polyoxymethylene copolymer has the following formula:

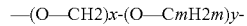

wherein
x is a positive integer, preferably from 10 to 10 000,
m is an integer from 2 to 6,
y is an integer from 0 to 10,
the ratio $y_{ar}/x_{ar}$ is from 0.001 to 0.7, such as from 0.01 to 0.5
$y_{ar}$ being the arithmetic mean of all values y in the polymer mixture; and
$x_{ar}$ being the arithmetic mean of all values x in the polymer mixture.

In one embodiment, the polyoxymethylene copolymer can have terminal methoxy groups alone or in combination with hydroxyl groups.

In one embodiment, the polyoxymethylene polymer is present in the polymer composition in an amount from about 40% to about 90% by weight, the coupling agent comprising an isocyanate and being present in the composition in an amount from about 0.1% to about 5% by weight. The reinforcing fibers may comprise glass fibers; the glass fibers being present in the composition in an amount from about 5% to about 45% by weight.

DETAILED DESCRIPTION

In general, the present disclosure is directed to a fiber reinforced polymer composition that has excellent mechanical properties and improved thermal mechanical properties. The polymer composition of the present disclosure can be used to mold all different types of products. The products can include, for instance, molded parts for use in the automotive industry, which can include engine parts including exhaust devices, interior automotive parts, and exterior automotive parts. The polymer composition can also be used to produce other molded products such as housings, latches, window winding systems, wiper systems, sunroof systems, seat adjustments, levers, gears, claws, pivot housings, and the like. The polymer composition may be used to produce various different consumer appliance products and products for use in the electronic component industry. Due to the improved thermal stability, the polymer composition may also be used to produce products that are subjected to relatively high temperature environments such as parts used in industrial processes.

In PCT Published application No. WO2012/049293, a coupled glass-fiber reinforced polyoxymethylene polymer composition is disclosed that has made great and meritorious advances in the art. In the '293 application, a polyoxymethylene copolymer is described that has terminal hydroxyl groups. The terminal hydroxyl groups may react with a coupling agent for better incorporating reinforcing fibers into the polymer matrix.

Polyoxymethylene copolymers typically exhibit greater chemical stability than a polyoxymethylene homopolymer. Homopolymers, however, can have higher mechanical properties such as tensile strength, modulus, impact strength, and creep resistance. According to the present disclosure, a polyoxymethylene copolymer is used that has extremely low amounts of comonomer. In this manner, a polymer is produced that has excellent thermal mechanical stability and chemical stability while also having excellent mechanical properties. The present inventors, further discovered, that the copolymer when combined with the reinforcing fiber, produces a polymer composition that has a heat deflection temperature higher than many copolymers used in the past.

The heat deflection temperature or heat distortion temperature, as used herein, is determined at 1.8 MPa and is recorded in °C. The heat deflection temperature is typically abbreviated in DTUL or HDT and is tested according to ISO Test 75 Method A. Polymer compositions according to the present disclosure, for instance, can have an HDT of greater than about 165° C. such as greater than about 170° C. The HDT is generally less than about 210° C.

The heat deflection temperature of a polymer composition can be an important property to consider when designing a product for a particular application. The heat deflection temperature, for instance, indicates the ability of a molded article to bear a load at an elevated temperature. The heat deflection temperature, can be used to determine the load bearing capacity of a molded product in high temperature environments.

The heat deflection temperature is also an important property to consider when molding parts. The heat deflection temperature, for instance, provides a relative indication for when a part can be removed from a mold without further cooling. A higher heat deflection temperature can indicate that less cooling is required in order to unload a mold and begin a subsequent molding process. Higher heat deflection temperatures can translate into faster throughput times in some applications.

Adding reinforcing fibers to a polyoxymethylene polymer is known to increase the heat deflection temperature. Those skilled in the art, however, have attempted to further increase the heat deflection temperature without adversely interfering with other properties. Use of a polyoxymethylene copolymer having relatively low comonomoner content has been found to not only dramatically increase the heat deflection temperature, but also provide improved mechanical properties.

In accordance with the present disclosure, the polyoxymethylene polymer in one embodiment, comprises a polyoxymethylene copolymer with relatively low comonomer content. The polyoxymethylene polymer, for instance, can primarily contain oxymethylene units with a relatively low proportion of comonomer units. For instance, the comonomer units can be from about 0.001 mol % to about 0.05 mol %. The comonomer units, for instance, may comprise oxyalkylene units such as oxyethylene units. The polyoxymethylene copolymer can be produced by cationic polymerization of trioxane with low amounts of a comonomer, such as dioxolane. In one embodiment, the polyoxymethylene copolymer can include terminal methoxy units. In one embodiment, the polyoxymethylene copolymer may also include terminal hydroxyl groups.

In one embodiment, an oxymethylene copolymer is used that comprises oxymethylene units and oxyalkylene units having at least two carbon atoms and a proportion of terminal alkyl ether groups and of terminal hydroxyalkylene groups having at least two carbon atoms. The proportion of terminal alkyl ether groups, in one embodiment, can be at least about 80%, while the proportion of terminal hydroxyalkylene groups can be less than about 20%.

Preferred oxymethylene copolymers comprise a proportion of oxyalkylene units having at least two carbon atoms, based on the proportion of the oxymethylene units, of between 0.001 mol % and 0.05 mol %, such as between 0.01 mol % and 0.05 mol %.

The oxymethylene copolymers can furthermore be distinguished in one embodiment by zero or a very low content of terminal formyl groups. This is typically from 0.01 to 2% of all terminal groups. Oxymethylene copolymers having a content of terminal formyl groups of less than 1% of all terminal groups are preferred. In addition, other conventional terminal groups, for example terminal hemiacetal groups, may still, if appropriate, be present in very small amounts, for example in amounts of less than 1%.

The oxymethylene copolymers can comprise a polymer of the formula I:

$$—(O—CH_2)_x—(O—C_mH_{2m})_y— \quad (I)$$

which have terminal alkyl ether groups of the formula —O—$R^1$ and terminal hydroxyalkylene groups of the formula —O—$C_mH_{2m}$—OH and, if appropriate, terminal groups of the formula —O—$R^2$, in which x is a positive integer, preferably from 10 to 10 000, such as from 300 and 10 000, m is an integer from 2 to 6, preferably 2, y is an integer from 0 to 10, the ratio $y_{ar}/x_{ar}$ is from 0.001 to 0.05

$y_{ar}$ being the arithmetic mean of all values y in the polymer mixture and $x_{ar}$ being the arithmetic mean of all values x in the polymer mixture, $R^1$ is a linear or branched alkyl group and In one embodiment, $R^2$ is a formyl group —CHO, with the proviso that the proportion of terminal alkyl ether groups of the formula —O—$R^1$, based on all terminal groups, is at least 80%, and that the proportion of terminal hydroxyalkylene groups of the formula —O—$C_mH_{2m}$—OH, based on all terminal groups, is up to 20%.

In one embodiment, $y_{ar}$ is the arithmetic mean of all values y in the polymer mixture and $x_{ar}$ is the arithmetic mean of all values x in the polymer mixture.

The mean value $x_{ar}$ can be from 50 to 5000.

$R^1$ and $R^2$ can be $C_1$-$C_6$-alkyl radicals, which may be straight-chain.

$R^1$ and $R^2$, independently of one another, can be methyl or ethyl, in particular methyl.

In one embodiment, the above copolymer can be formed with greater amounts of terminal hydroxyl groups. Terminal hydroxyl groups, for instance, may comprise hydroxyethylene groups, or hemi-acetal groups. For instance, in one embodiment, more than 25%, such as more than 50%, such as more than 75% of the terminal groups are hydroxyl groups.

For instance, the polyoxymethylene copolymer can have a content of terminal hydroxyl groups of at least about 10 mmol/kg, such as greater than 12 mmol/kg, such as greater than about 14 mmol/kg, such as greater than about 16 mmol/kg. The terminal hydroxyl groups may generally be less than 50 mmol/kg, such as less than about 30 mmol/kg.

The content of terminal hydroxyl groups can be determined as described in K. Kawaguchi, E. Masuda, Y. Tajima, Journal of Applied Polymer Science, Vol. 107, 667-673 (2008).

The oxymethylene polymers described above can be formed from a process which comprises:

a) polymerization of least one monomer forming —$CH_2$—O— units and at least one monomer forming oxyalkylene units having at least two carbon atoms, in the presence of at least one acetal of formaldehyde, with at least one protic acid or one of its derivatives as an initiator, the concentration of the initiator being less than $10^{-4}$ mol %, based on the amount of monomers which are present at the beginning of the polymerization and form —$CH_2$—O— units, b) use of starting materials of the polymerization such that the content of water and formic acid at the beginning of the polymerization is less than or equal to 40 ppm, and
c) deactivation of the initiator and/or of the active polymer chains by treatment of the prepared polymer with basic compounds in a protic solvent.

Step a) of the process is a polymerization of monomers forming —CH$_2$—O— units with at least one monomer forming oxyalkylene units having at least two carbon atoms and optionally further comonomers and/or branching agents. The polymerization can be effected homogeneously or preferably heterogeneously.

A monomer forming —CH$_2$—O— units and a monomer forming oxyalkylene units having at least two carbon atoms or a mixture of different monomers is reacted in a manner with protic acids as an initiator of the cationic polymerization and with acetals of formaldehyde as regulator. The polymerization can be effected at atmospheric pressure or at moderate pressures up to 25 bar, for example at pressures of from 1 to 10 bar.

The polymerization temperature can be below the melting point of the resulting polymer.

Typical polymerization temperatures are in the range from 60 to 160° C., such as from 70 to 140° C.

The molecular weights, characterized as melt volume flow rate MVR, of these polymers can be adjusted within wide ranges. Typical MVR values are from 0.1 to 100 g/10 min, such as from 1 to 80 g/10 min, measured according to EN ISO 1133 at 190° C. at a load of 2.16 kg. In one embodiment, a polyoxymethylene polymer may be used in the composition that has a relative low melt volume flow rate, such as less than about 4 g/10 min., such as from about 1 g/10 min to about 4 g/10 min. In an alternative embodiment, however, a polyoxymethylene polymer may be selected that has a higher melt volume flow rate. For instance, the melt volume flow rate of the polymer can be greater than about 5 g/10 min, such as greater than about 6 g/10 min, such as greater than about 7 g/10 min. In one embodiment, for instance, the melt volume flow rate can be from about 5 g/10 min to about 12 g/10 min.

If desired, small amounts of branching agents may be used. Usually, the amount of branching agents is not more than 1% by weight, based on the total amount of monomers which is used for the preparation of the oxymethylene polymers, preferably not more than 0.3% by weight. Preferred branching agents are polyfunctional epoxides, glycidyl ethers or cyclic formals.

In one embodiment at a chain transfer agent (regulator) comprises compounds of the formula II

$$R^3—(O—CH_2)_q—O—R^4 \quad (II)$$

in which R$^3$ and R$^4$, independently of one another, are linear or branched alkyl radicals, in particular C$_1$-C$_6$-alkyl radicals, which can be straight-chain.

R$^3$ and R$^4$, independently of one another, can be methyl, ethyl, propyl or butyl.

In one embodiment, the chain transfer agents are compounds of the formula II in which q is 1 or methylal.

The chain transfer agents are usually used in amounts of up to 20 000 ppm, preferably from 100 to 5000 ppm, such as from 200 to 2000 ppm, based on the monomer mixture.

In an alternative embodiment, a glycol such as ethylene glycol may be used as a molecular weight regulator. When ethylene glycol is used as a regulator, greater amounts of terminal hydroxy groups may be created on the polymer chains.

Suitable initiators are in particular strong protic acids, such as fluorinated or chlorinated alkane- and arylsulfonic acids, e.g. trifluoromethanesulfonic acid, or derivatives thereof, such as esters or anhydrides of protic acids, in particular trifluoromethanesulfonic anhydride or trifluoromethanesulfonic esters, such as the alkyl esters. Also suitable are perchloric acid and esters thereof and protic acids in the presence of salts thereof.

Initiators are those compounds which, in concentrations of <10$^{-4}$ mol %, initiate the polymerization.

The initiators are used in very small amounts. In the process, initiators are used in an amount of less than or equal to 10$^{-4}$ mol %, preferably from 10$^{-6}$ mol % to 10$^{-4}$ mol %, based on the amount of the monomers which are present at the beginning of the polymerization and form —CH$_2$—O— units.

In the process according to the invention, purified starting materials are used in the polymerization, such that the content of water and formic acid during the polymerization is less than 100 ppm, such as less than 40 ppm, based on the amount of monomers present at the beginning of the polymerization and forming —CH$_2$—O— units. The determination of the water and formic acid content in the monomers is effected by the conventional methods, i.e. water by Karl Fischer and formic acid by acid-based titration.

After polymerization, the solid or liquid polymerization mixture is dissolved according to point c) using a protic solvent which contains at least one base. As a result, the initiator and active polymer chains are deactivated. A thermal, controlled degradation of the unstable terminal groups takes place.

The dissolution is typically effected at temperatures from 130 to 200° C., such as from 140 to 190° C.

All of these compounds which are capable of ending a cationic polymerization, for example compounds which undergo a basic reaction with water, can be used as the base. Bases which do not react with formaldehyde are preferred. Examples are tertiary amines, such as triethylamine, or secondary alkali metal phosphates, such as disodium hydrogen phosphate, or amides, such as dimethylformamide or dimethylacetamide, or aromatic amines, such as melamine.

Typical deactivation pressures are in the range from 1 to 50 bar, preferably from 2 to 30 bar, in particular from 3 to 20 bar.

The duration of the thermal treatment is from 10 seconds to 2 hours, preferably from 1 minute to 60 minutes, depending on the temperature. The treatment can be effected with substantial exclusion of oxygen.

The protic solvent used can be a mixture which contains water and methanol. The water concentration is from 2% by weight to 50% by weight, such as from 5% by weight to 30% by weight. The methanol concentration is from 50 to 90% by weight, such as from 70% by weight to 90% by weight.

After the deactivation and degradation of the unstable fractions in the above-described protic solvent which has been made basic, the polymer is precipitated. The precipitation can be effected, for example, by cooling the solution. The precipitation is followed by drying of the polymer. Mechanical and/or thermal methods can be used for drying.

The polyoxymethylene polymer is present in the polymer composition generally in an amount greater than about 40% by weight, such as in an amount greater than 50% by weight, such as in an amount greater than 60% by weight. In certain embodiments, for instance, the polymer composition may contain the polyoxymethylene polymer in amounts greater than about 70% by weight, such as in amounts greater than about 80% by weight, such as even in amounts greater than about 90% by weight. In general, the polyoxymethylene polymer is present in the polymer composition in an amount less than about 98% by weight, such as in an amount less than about 95% by weight.

In addition to a polyoxymethylene polymer, the polymer composition in the present disclosure contains a coupling agent and at least one reinforcing fiber.

The coupling agent provides a linkage between the polyoxymethylene and the reinforcing fiber and/or the sizing material which is coated on the reinforcing fiber. In principle any coupling agent which is capable to react with nucleophilic groups such as —OH or —NH$_2$ can be used.

The coupling agent improves the compatibility of the reinforcing fibers with the polymer matrix. A suitable coupling agent is a polyisocyanate, preferably organic diisocyanate, more preferably a polyisocyanate selected from the group consisting of aliphatic diisocyanates, cycloaliphatic diisocyanates, aromatic diisocyanates and mixtures thereof.

Preferred are polyfunctional coupling agents, such as trifunctional or bifunctional agents.

Preferably, the polyisocyanate is a diisocyanate or a triisocyanate which is more preferably selected from 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4''-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis(isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanatomethyl-3,5,5-trimethylcyclo-hexyl isocyanate, 1-isocyanato-3,3,5-trimethyl-5-isocyanatomethylcyclohexane, cyclohexyl isocyanate, dicyclohexylmethane 4,4'-diisocyanate, 1,4-bis(isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, or mixtures thereof.

Especially preferred are aromatic polyisocyanates, such as 4,4'-diphenylmethane diisocyanate (MDI).

The molding composition of the present invention comprises the coupling agent preferably in an amount ranging from 0.1 to 5 weight-%, more preferably ranging from 0.2 to 3 weight-% and most preferably ranging from 0.3 to 1.5 weight-%, wherein the weight is based on the total weight of the composition.

Reinforcing fibers which may be included in the composition are mineral fibers, such as glass fibers, polymer fibers, in particular organic high-modulus fibers, such as aramid fibers, metal fibers, such as steel fibers, carbon fibers, natural fibers, and/or fibers from renewable resources.

These fibers may be in modified or unmodified form, e.g. provided with a sizing, or chemically treated, in order to improve adhesion to the plastic. Glass fibers are particularly preferred.

Glass fibers are provided with a sizing to protect the glass fiber, to smooth the fiber but also to improve the adhesion between the fiber and the matrix material. A sizing usually comprises silanes, film forming agents, lubricants, wetting agents, adhesive agents optionally antistatic agents and plasticizers, emulsifiers and optionally further additives.

Specific examples of silanes are aminosilanes, e.g. 3-trimethoxysilylpropylamine, N-(2-aminoethyl)-3-aminopropyltrimethoxy-silane, N-(3-trimethoxysilanylpropyl)ethane-1,2-diamine, 3-(2-aminoethyl-amino)propyltrimethoxysilane, N-[3-(trimethoxysilyl)propyl]-1,2-ethane-diamine.

Film forming agents are for example polyvinylacetates, polyesters and polyurethanes. Sizings based on polyurethanes may be used advantageously.

The reinforcing fibers may be compounded into the polyoxymethylene matrix, for example in an extruder or kneader. However, the reinforcing fibers may also advantageously take the form of continuous-filament fibers sheathed or impregnated with the polyoxymethylene molding composition in a process suitable for this purpose, and then processed or wound up in the form of a continuous strand, or cut to a desired pellet length so that the fiber lengths and pellet lengths are identical. An example of a process particularly suitable for this purpose is the pultrusion process.

According to the invention, the long-fiber-reinforced polyoxymethylene molding composition may be a glass-fiber bundle which has been sheathed with one or more layers of the polyoxymethylene matrix polymer in such a way that the fibers have not been impregnated and mixing of the fibers and the polyacetal matrix polymer does not take place until processing occurs, for example injection molding. However, the fibers have advantageously been impregnated with the polyacetal matrix polymer.

According to a preferred embodiment, the molding composition of the present invention comprises at least one reinforcing fiber which is a mineral fiber, preferably a glass fiber, more preferably a coated or impregnated glass fiber. Glassfibers which are suitable for the molding composition of the present invention are commercially available, e.g. Johns Manville, ThermoFlow®Chopped Strand 753, OCV Chopped Strand 408 A, Nippon Electric Glass Co. (NEG) Chopped Strand T-651.

The reinforcing fibers are preferably present in the molding composition of the present invention in an amount ranging from 5 to 45 wt.-% and especially preferably from 10 to 40 wt.-%, wherein the weight is based on the total weight of the composition.

Long fiber reinforced molding compositions may show improved mechanical properties compared to short fiber reinforced compositions. Moreover, the molding compositions of the present invention with long fiber reinforced polyoxymethylene even demonstrate improved flex fatigue and creep resistance of the molded products.

In one embodiment, the coupling agent reacts with the active end groups of the POM polymer and with the sizing on the glass fiber to chemically bond the POM to the fiber glass. The chemical bond prevents the glass fiber from separating from the POM, as is typical for some grades of POM, due to the poor adhesion between the standard POM and the glass fiber. The increased bonding between the POM matrix and the long glass fiber improves the mechanical strength of the POM/fiber glass composites significantly.

In one embodiment, A long-fiber-reinforced molding composition is prepared by a pultrusion process, where
i) fiber bundles are conducted through a die charged with a melt made from a polymer matrix comprising at least one polyoxymethylene, the at least one coupling agent, and other optional components,
ii) the immersed fiber bundles can be conducted through a shaping die,
iii) the fiber bundles are optionally cooled,
iv) the fiber bundles are optionally postformed, and
v) the fiber bundles are cut to the length of the structure preferably substantially perpendicular to their running direction, or are wound up in the form of a continuous structure.

The impregnation of the fiber bundles with the polymer matrix, for example via pultrusion in step i) of the above process, may also take place by other suitable processes. For example, the fibers may be impregnated by a process in which the fiber bundle is saturated by the polymer matrix, wherein the fiber bundle is laid onto carrier equipment, and wherein the carrier equipment, together with the fiber bundle lying thereon, is conducted through impregnating equipment. A process of this type is described in EP-A-756 536.

The fiber may also be impregnated by a process in which a plastifying extruder is used and a fiber strand is conducted by way of guide apertures and preheating equipment and is wetted with a liquid-film of the polymer matrix in an impregnating apparatus and then is introduced into the plastifying extruder in which the individual fibers are chopped and mixed, the mixture being discharged in the form of a fiber-reinforced polymer composition of the invention, which may be capable of further processing, wherein the following steps can be used:
a) passing by way of coating nozzles into the inlet of the plastifying extruder, and preferably parallel to the extruder axes and approximately tangentially, the fiber strand is wound up onto an extruder screw and around the extruder screws in an advancing direction, and also drawn into holes in the extruder barrel, whose diameter has been enlarged by at least four times the thickness of the fiber strand, where
b) preferably in the inlet the right-hand coating nozzle directly applies a film of polymer to one side of the fiber strand, while application to the second side takes place indirectly by pressing the fiber strand into the liquid film of polymer matrix previously applied from the left-hand coating nozzle to the screw shaft, whereupon the individual continuous-filament fibers are subjected to impregnating or penetrating action at the extruder screws on both flat sides of the fiber strand in an inlet and impregnating section and these sides are wetted or saturated by the liquid films of thermoplastic polymer,
c) and then the fiber strand or the individual fibers thoroughly saturated or thoroughly impregnated with polymer matrix are passed out of the inlet and impregnation section by way of a cutting edge into the short discharge and conveying section of a reduced-diameter barrel, and thus chopped into substantially predetermined lengths.

An example of the process of this type is described in DE-A-1 98 36 787.

The environmentally compatible and cost-effective process described preferably gives a small rod-shaped structure of a certain shape. The length of the rod-shaped structure is from 3 to 100 mm, preferably from 4 to 50 mm, and particularly preferably from 5 to 15 mm. The diameter of the rod-shaped structure, also termed a pellet, is generally from 1 to 10 mm, from 2 to 8 mm, and particularly preferably from 3 to 6 mm.

The molding compositions of the process may comprise 40 to 90 wt.-% of polyoxymethylene,
0.1 to 5.0 wt.-% of coupling agent, which is preferably a polyisocyanate; and
5 to 45 wt.-% of the continuous fiber filament, preferably a glass fiber roving.

Optionally, the molding composition may contain a formaldehyde scavenger. Formaldehyde scavengers are additives for scavenging formaldehyde. Suitable formaldehyde scavengers are nitrogen-containing stabilizers. Mainly, of these are heterocyclic compounds having at least one nitrogen atom as hetero atom which is either adjacent to an amino-substituted carbon atom or to a carbonyl group, for example pyridine, pyrimidine, pyrazine, pyrrolidone, aminopyridine and compounds derived therefrom. Advantageous compounds of this nature are aminopyridine and compounds derived therefrom. Any of the aminopyridines is in principle suitable, for example 2,6-diaminopyridine, substituted and dimeric aminopyridines, and mixtures prepared from these compounds. Other advantageous materials are polyamides and dicyane diamide, urea and its derivatives and also pyrrolidone and compounds derived therefrom. Examples of suitable pyrrolidones are imidazolidinone and compounds derived therefrom, such as hydantoines, derivatives of which are particularly advantageous, and those particularly advantageous among these compounds are allantoin and its derivatives. Other particularly advantageous compounds are triamino-1, 3,5-triazine (melamine) and its derivatives, such as melamine-formaldehyde condensates and methylol melamine. Very particular preference is given to melamine, methylol melamine, melamine-formaldehyde condensates, and allantoin. Oligomeric polyamides are also suitable in principle for use as formaldehyde scavengers. The formaldehyde scavenger may be used individually or in combination.

Further, the aldehyde scavenger can be a guanidine compound which can include an aliphatic guanamine-based compound, an alicyclic guanamine-based compound, an aromatic guanamine-based compound, a hetero atom-containing guanamine-based compound, or the like.

Examples of the aliphatic guanamine-based compounds include monoguanamines such as acetoguanamine, valeroguanamine, caproguanamine, heptanoguanamine, capryloguanamine or stearoguanamine; alkylene bisguanamines such as succinoguanamine, glutaroguanamine, adipoguanamine, pimeloguanamine, suberoguanamine, azeloguanamine or sebacoguanamine.

Examples of the alicyclic guanamine-based compounds include monoguanamines such as cyclohexanecarboguanamine, norbornene carboguanamine, cyclohexenecarboguanamine or norbornane carboguanamine; and derivatives thereof in which the cycloalkane residue is substituted with 1 to 3 functional groups such as alkyl group, hydroxy group, amino group, acetoamino group, nitrile group, carboxy group, alkoxycarbonyl group, carbamoyl group, alkoxy group, phenyl group, cumyl group or hydroxyphenyl group.

Examples of the aromatic guanamine-based compounds are monoguanamines such as benzoguanamine and derivatives thereof in which the phenyl residue is substituted with 1 to 5 functional groups such as alkyl group, hydroxy group, amino group, acetoamino group, nitrile group, carboxy group, alkoxy carbonyl group, carbamoyl group, alkoxy group, phenyl group, cumyl group or hydroxyphenyl group, (for example, toluguanamine, xyloguanamine, phenylbenzoguanamine, hydroxybenzoguanamine, 4-(4'-hydroxyphenyl)benzoguanamine, nitrilebenzoguanamine, 3,5-dimethyl-4-hydroxybenzoguanamine, 3,5-di-t-butyl-4-hydroxybenzoguanamine, and the like), naphthoguanamine and derivatives thereof in which the naphthyl residue is substituted with the above functional group; polyguanamines such as phthaloguanamine, isophthaloguanamine, terephthaloguanamine, naphthalene diguanamine or biphenylene diguanamine; aralkyl- or aralkylene-guanamines such as phenylacetoguanamine, [beta]-phenylpropioguanamine or xylylene bisguanamine.

Examples of the heteroatom-containing guanamine-based compound include acetal group-containing guanamines such as 2,4-diamino-6-(3,3-dimethoxypropyl-s-triazine; dioxane ring-containing guanamines such as [2-(4',6'-diamino-s-triazin-2'-yl)ethyl]-1,3-dioxane or [2-(4',6'-diamino-s-triazin-2'-yl)ethyl]-4-ethyl-4-hydroxymethyl-1,3-dioxane; tetraoxospiro ring-containing guanamines such as CTU-guanamine or CMTU-guanamine; isocyanuric ring-containing guanamines such as 1,3,5-tris(2-(4',6'-diamino-s-triazin-2'-yl)ethyl)isocyanurate or 1,3,5-tris[3-(4',6'-diamino-s-triazin-2'-yl)propyl]-isocyanurate); imidazoyl ring-containing guanamines such as guanamine compounds described in JP-A 6-179671 and JP-A 7-10871; imidazole ring-containing guanamines such as guanamine compounds described in JP-A 47-41120, JP-A 3-284675 and JP-A 7-33766; and guanamine compounds described in JP-A 2000-154181, and the like.

Furthermore, the guanamine-based compound includes a compound in which the hydrogen atom of the amino group of the aforementioned guanamine-based compound is substituted with an alkoxymethyl group such as mono- to tetra-methoxymethylbenzoguanamine, mono- to octa-methoxymethyl-CTU-guanamine, or the like.

Among these guanamine-based compounds, particularly preferable are guanamine, acetoguanamine, benzoguanamine, and CTU-guanamine.

Further formaldehyde scavengers which are linked to oligomers or polymers are also suitable. Examples of these groups of formaldehyde scavengers are shown in formula I.

$$R^1-[X-CO-NH-R^3-NH-CO-NR^2-R^4]_o \qquad (I),$$

wherein
$R^1$ is a moiety comprising 2 to 20 carbon atoms, preferably an aliphatic or aromatic rest, more preferably the aliphatic or aromatic rest of a polyhydroxy or a polyamino compound having at least 2, preferably 2 to 6 hydroxy and/or amino groups,
X is —O— or —NR²—
$R^2$ is H, alkyl, cycloalkyl, aryl or aralkyl,
$R^3$ is alkylene, cycloalkylene, arylene or aralkylene,
$R^4$ is a moiety selected from the formula II, III, IV, V, VI and VII

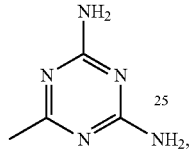
(II)

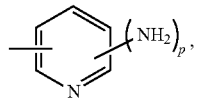
(III)

—CO—NHR², (IV)

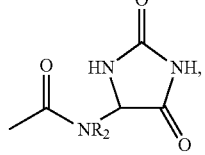
(V)

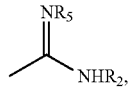
(VI)

—HN—C(=NH)—NH—CN, (VII)

wherein
$R^5$ is H, —CO—CH₃ or —CO—C₆H₅,
o is an integer ranging from 2 to 6 and
p is 1 or 2.

Additionally, suitable formaldehyde scavengers are imidazolidine-2-one compounds. Preference is given to imidazolidine-2-one compounds of the following formula:

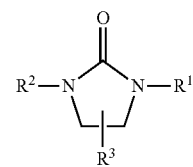

wherein $R^1$ and $R^2$ are independently from each other H, $C_1$-$C_{20}$-alkyl, OR4, —NO₂, hydroxyalkyl having 1 to 10 carbon atoms, $R^3$ is H, $C_1$-$C_{20}$ alkyl which is optionally substituted, keto group, aldehyde group, —COOR4, amine or amide group, or an aromatic ring having 5 to 10 carbon atoms, $R^4$ is a $C_1$-$C_4$-alkyl.

Especially preferred imidazolidine-2-one compounds are:

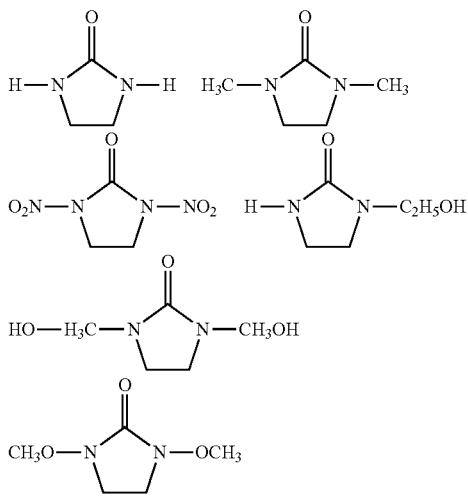

It has been surprisingly found that aromatic formaldehyde scavengers (D) are very suitable for the molding compositions of the present invention.

According to one embodiment of the present invention, the formaldehyde scavenger has a melting point higher than 235° C., preferably higher than 250° C., more preferably higher than 280° C., most preferably higher than 300° C. and especially higher than 320° C. Further, it has been found that the pKa value of the formaldehyde scavenger may influence the formaldehyde emission. According to a preferred embodiment, the formaldehyde scavenger has a pKa value ranging from 4.5 to 10, preferably from 4.5 to 6.5.

Further, preference is given to a formaldehyde scavenger which has at least one triazine moiety. The use of formaldehyde scavengers which comprise at least one triazine moiety does not only have excellent formaldehyde reducing properties but also positively influences the mechanical properties of the molding composition. Preferred formaldehyde scavengers which comprise a triazine moiety are selected from the group consisting of guanamine, melamine, N-butylmelamine, N-phenylmelamine, N,N-diphenylmelamine, N,N-diallylmelamine, N,N',N"-triphenylmelamine, benzoguanamine, acetoguanamine, 2,4-diamino-6-butyl-sym-triazine, ammeline, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine, 2-oxy-4,6-diamino-sym-triazine, 1,1-bis(3,5-diamino-2,4,6-triazinyl)methane, 1,2-bis(3,5-diamino-2,4,6-triazinyl)ethyne (other name: succinoguanamine), 1,3-bis(3,5-diamino-2,4,6-triazinyl)propane, 1,4-bis(3,5-diamino-2,4,6-triazinyl)butane, methylenated melamine, ethylenedimelamine, triguanamine, melamine cyanurate, ethylene dimelamine cyanurate and cyanurate.

These triazine derivatives may be used singly or in combinations of two or more compounds. Guanamines and melamine are preferred, and melamine is particularly preferable.

Preferred formaldehyde scavengers are hydrazides, more preferably dihydrazides such as sebacic dihydrazide (SDH).

Examples of the hydrazide compound which can be used in the present invention as formaldehyde scavenger include an aliphatic carboxylic acid hydrazide-based compound, an alicyclic carboxylic acid hydrazide-based compound, an aromatic carboxylic acid hydrazide-based compound, hetero atom-containing carboxylic acid hydrazide-based compound, a polymer-type carboxylic acid hydrazide-based compound, and the like. These carboxylic acid hydrazides can be used alone or in combination of two or more of them.

Examples of the aliphatic carboxylic acid hydrazide-based compound include: monocarboxylic acid hydrazide (lauric acid hydrazide, stearic acid hydrazide, 12-hydroxystearic acid hydrazide 1,2,3,4-butane tetracarboxylic acid hydrazide or the like); polycaboxylatic acid hydrazide such as succinic acid mono- or di-hydrazide, glutaric acid mono- or di-hydrazide, adipic acid mono- or di-hydrazide, pimelic acid mono- or di-hydrazide, suberic acid mono- or di-hydrazide, azelaic acid mono- or di-hydrazide, sebacic acid mono- or di-hydrazide, dodecanedioic acid mono- or di-hydrazide, hexadecane dioic acid mono- or di-hydrazide, eicosandioic acid mono- or di-hydrazide, 7,11-octadecadiene-1,18-dicarbohydrazide, and the like. Examples of the alicyclic carboxylic acid hydrazide-based compound include: monocarboxylic acid hydrazides such as cyclohexane carboxylic acid hydrazide; and polycarboxylic acid hydrazides such as dimer acid mono- or di-hydrazide, trimer acid mono- to tri-hydrazide, 1,2-, 1,3-, or 1,4-cyclohexane dicarboxylic acid mono- or di-hydrazide, cyclohexane tricaboxylic acid mono- to tri-hydrazide, and the like. Examples of the aromatic carboxylic acid hydrazide include: mono-carboxylic acid hydrazides (benzoic acid hydrazide and functional group substitution products thereof, such as derivatives where functional groups such as alkyl group, hydroxy group, acetoxy group, amino group, acetoamino group, nitrile group, carboxy group, alkoxycarbonyl group, carbamoyl group, alkoxy group, phenyl group, benzyl group, cumyl group, or hydroxyphenyl group are substituted by 1 to 5 phenyl residues of benzoguanamine (for example, o-toluic acid hydrazide, m-toluic acid hydrazide, p-toluic acid hydrazide, 2,4-, 3,4-, 3,5- or 2,5-dimethyl-benzoic acid hydrazide, o-, m- or p-hydroxy-benzoic acid hydrazide, o-, m- or p-acetoxy-benzoic acid hydrazide, 4-hydroxy-3-phenyl-benzoic acid hydrazide, 4-actoxy-3-phenyl-benzoic acid hydrazide, 4-pheny-benzoic acid hydrazide, 4-(4'-phenyl)benzoic acid hydrazide, 4-hydroxy-3,5-dimethyl-benzoic acid hydrazide, 4-hydroxy-3,5-di-t-butyl-benzoic acid hydrazide, 4-hydroxy-3,5-di-t-butylphenyl-benzoic acid hydrazide, and 4-hydroxy-3,5-di-t-butylphenyl-propionic acid hydrazide); [alpha]- or [beta]-naphthoic acid hydrazide and functional substitution products thereof, such as 1-naphthoic acid hydrazide, 2-naphthoic acid hydrazide, 3-hydroxy-2-naphthoic acid hydrazide, or 6-hydroxy-2-naphthoic acid hydrazide; and polycarboxylic acid hydrazides such as isophthalic acid mono- or di-hydrazide, terephthalic acid mono- or di-hydrazide, 1,4- or 2,6-naphthalene dicarboxylic acid mono- or di-hydrazide, 3,3'-, 3,4'- or 4,4'-diphenyldicarboxylic acid mono- or di-hydrazide, diphenylether dicarboxylic acid mono- or di-hydrazide, diphenylmethane dicarboxylic acid mono- or di-hydrazide, diphenylethane dicarboxylic acid mono- or di-hydrazide, diphenoxyethane dicarboxylic acid mono- or di-hydrazide, diphenylsulphone dicarboxylic acid mono- or di-hydrazide, diphenylketone dicarboxylic acid mono- or di-hydrazide, 4,4"-terphenyl dicarboxylic acid mono- or di-hydrazide, 4,4'''-quaterphenyldicarboxylic acid mono- or di-hydrazide, 1,2,4-benzene tricarboxylic acid mono- to tri-hydrazide, pyromellitic acid mono- to tetra-hydrazide, and 1,4,5,8-naphthoic acid mono- to tetra-hydrazide).

Examples of the heteroatom-containing carboxylic acid hydrazide-based compound include: mono- or di-hydrazide of dioxane ring-containing carboxylic acid hydrazides such as 5-methylol-5-ethyl-2-(1,1-dimethyl-2-carboxyethyl)-1,3- dioxane; tetraoxospiro ring-containing carboxylic acid hydrazides such as mono- or di-hydrazide of 3,9-bis(2-carboxyethyl)-2,4,8,10-tetraoxospiro[5,5]undecane, mono- or di-hydrazide of 3,9-bis(2-methoxycarbonylethyl)-2,4,8,10-tetraoxospiro[5,5]undecane, mono- or di-hydrazide of 3,9-bis(1,1-dimethyl-1-carboxymethyl)-2,4,8,10-tetraoxospiro[5,5]undecane, or mono- or di-hydrazide of 3,9-bis(1,1-dimethyl-1-methoxycarbonylmethyl)-2,4,8,10-tetraoxospiro[5,5]undecane; isocyanuric ring-containing carboxylic acid hydrazides such as mono- to tri-hydrazide of 1,3,5-tris[2-carboxyethyl]isocyanulate, or mono- to tri-hydrazide of 1,3,5-tris(3-caboxypropyl)isocyanurate; and hydantoin ring-containing carboxylic acid hydrazides such as 1,3-bis(2-hydrazinocarbonylethyl)5-isopropyl hydantoin.

The polymer-type carboxylic acid hydrazide-based compounds are exemplified as follows: single polymers or copolymers of poly(meth)acrylic acid hydrazides which may be cross-linked compounds, such as olefin copolymer, vinyl monomer copolymer, styrene copolymer of divinylbenzene crosslinked compound, or bis(meth)acrylic ester crosslinked compound; polymer described in JP-A 55-145529 and JP-A 56-105905; commercially available "amino polyacrylic amide APA" Otsuka Chemical Co., Ltd.; and copolymer described in U.S. Pat. No. 3,574,786.

The formaldehyde scavenger can be present in the composition in an amount of up to 2 weight-%, more preferably in an amount ranging from 0.001 to 1.5 wt.-%, further more preferably ranging from 0.01 to 1.0 wt.-%, most preferably ranging from 0.05 to 0.5 wt.-% and especially ranging from 0.08 to 0.3 weight-%, wherein the weight is based on the total weight of the composition.

The molding materials or moldings according to the invention can optionally be stabilized and/or modified by known additives. Stabilizers can be present in an amount up to 10 wt.-%, preferably 0.1 to 5 wt.-%, more preferably 0.5 to 3 wt.-%.

The stabilizers are, for example, antioxidants, acid scavengers, UV stabilizers or heat stabilizers. In addition, the molding material or the molding may contain processing auxiliaries, for example adhesion promoters, lubricants, nucleating agents, demolding agents, fillers, or antistatic agents and additives which impart a desired property to the molding material or to the molding, such as dyes and/or pigments and/or impact modifiers and/or glass beads and/or additives imparting electrical conductivity; and mixtures of these additives, but without limiting the scope to said examples.

The molding composition may further comprise one or more tribological modifiers. Various different types of tribological modifiers may be incorporated into the molding composition. The tribological modifier may comprise, for instance, polytetrafluoroethylene particles, molybdenum sulfide particles, calcium carbonate particles, polymer particles containing a graft copolymer of an olefin grafted to a polyvinyl or a polyether, graft copolymer particles containing an elastomeric core comprising a polydiene and a hard graft comprised of a (meth)acrylate and/or a (meth)acrylonitrile, ultrahigh-molecular-weight polyethylene particles, stearyl stearate particles, wax particles comprising an aliphatic ester wax comprised of a fatty acid and a monohydric alcohol, a polyethylene wax, silicon oil, or an amide wax, or mixtures thereof. In general, one or more tribological modifiers may be present in the composition in an amount from about 1% to about 50% by weight, preferably in an amount ranging from about 3 to about 30 wt.-%.

In one embodiment, the tribological modifier comprises or substantially consists of an ultrahigh-molecular weight polyethylene (UHMW-PE). It has been found that specifically good results could be achieved with molding compositions which comprise coupling agents and reinforcing fibers.

Ultrahigh-molecular-weight polyethylene (UHMW-PE) can be employed for example as a powder, in particular as a micro powder. The use of UHMW-PE significantly reduces wear and improves the sliding properties. The UHMW-PE generally has a mean particle diameter $D_{50}$ (volume based and determined by light scattering) in the range of 1 to 5000 µm, preferably from 10 to 500 µm and particularly preferably from 10 to 150 µm such as 30 to 130 µm or 80 to 150 µm or 30 to 90 µm.

The UHMW-PE can have an average molecular weight of higher than $1.0 \cdot 10^6$ g/mol, preferably higher than $2.0 \cdot 10^6$ g/mol, more preferably higher than $4.0 \cdot 10^6$ g/mol, especially having an average molecular weight ranging from $1.0 \cdot 10^6$ g/mol to $15.0 \cdot 10^6$ g/mol, more especially ranging from $3.0 \cdot 10^6$ g/mol to $12.0 \cdot 10^6$ g/mol, determined by viscosimetry.

Preferably, the viscosity number of the UHMW-PE is higher than 1000 ml/g, more preferably higher than 1500 ml/g, especially ranging from 1800 ml/g to 5000 ml/g, such as ranging from 2000 ml/g to 4300 ml/g (determined according to ISO 1628, part 3; concentration in decahydronaphthalin: 0.0002 g/ml).

Suitable UHMW-PE is commercially available from Ticona GmbH, Germany under the tradename GUR®, such as GUR®4120 and GUR®4150.

In a preferred embodiment the ultrahigh molecular weight polyethylene can be present in an amount up to 30 wt.-%, preferably in an amount ranging from 1 to 25 wt.-%, more preferably ranging from 2.5 to 20 wt.-%, especially 4.5 to 15 wt.-%, such as 5.5 to 12 wt.-%, e.g. 6.5 to 9.5 wt.-%, wherein the amount is based on the total weight of the composition.

The reaction of the components is typically effected at temperatures of from 100 to 260° C., such as from 150 to 220° C., and the duration of mixing is typically from 0.2 to 60 minutes.

Molded products that may be produced may be used in the automotive industry, especially housings, latches, window winding systems, wiper systems, sun roof systems, seat adjustment, levers, gears, claws, pivot housings or wiper arms.

The molded parts can be obtained by extrusion, injection molding thermoforming, blow molding, rotational molding and the like.

The molding composition is especially suitable to be used in the manufacturing of molded parts used in the automotive industry. Thus, a further embodiment is the use of the composition according to the present invention for the manufacturing of molded parts used in the automotive industry.

A further embodiment is the use of the composition or molded parts of the present invention for housings, latches, window winding systems, pulleys, wiper systems, sun roof systems, seat adjustment, levers, gears, claws, pivot housings, wiper arms, brackets or seat rails.

Due to the high tensile strength of the molding composition of the present invention the compositions can be used for injection molded structural parts that require high tensile strength (>170 MPa) as well as low flex fatigue and superior creep performance. A typical application for the composition is seat rails for automobiles.

The present disclosure may better understood with reference to the following example.

EXAMPLE

Various polymer compositions were formulated and tested for mechanical properties including heat deflection temperature. As will be demonstrated below, the use of a polyoxymethylene copolymer having low comonomer content produces a composition that has a dramatically improved heat deflection temperature while also having excellent mechanical properties.

The polymer compositions included a polyoxymethylene polymer combined with glass fibers. In sample numbers 1 and 2 below, a polyoxymethylene copolymer was used that has a low comonomer content. In particular, the low comonomer polyoxymethylene copolymer was a methoxy terminated polymer having a dioxolane content of less than 0.05 mol %. The polymer had a melt flow rate of 8 g/10 min.

In sample number 3 below, a polyoxymethylene copolymer was used that had a dioxolane comonomer content of about 3.4 weight %. The copolymer had terminal hydroxyl groups in an amount from about 20 to about 25 mmol/kg. The polymer had a meltflow rate of 8 g/10 min.

In sample number 4 below, a homopolymer was used. The polyoxymethylene homopolymer was obtained from DuPont and is sold under the name DELRIN.

In each of the samples, the polymer was combined with sized glass fiber. The coupling agent used was methylenediphenyl-4,4'-diisocyanate(MDI). In some of the formulations, a nucleating agent was added in addition to melamine. The sterically hindered phenolic antioxidant used was pentaerythritol tetrakis (3-(3,5-di-tert-butyl-4-hydroxyphenyl) propionate). The following polymer compositions were tested:

TABLE 1

| Component | Sample No. 1 | Sample No. 2 | Sample No. 3 | Sample No. 4 |
|---|---|---|---|---|
| POM Homopolymer | — | — | — | 75 |
| POM-OH Copolymer | — | — | 73.7 | — |
| POM Copolymer With low comonomer content | 70.9 | 73.7 | — | — |
| Sized Glass Fiber | 27.8 | 25.5 | 25 | 25 |
| MDI coupling Agent | 0.5 | — | 0.5 | — |
| BDGE - dioxolane-trioxane terpolymer (nucleating agent) | 0.5 | 0.5 | 0.5 | — |
| Sterically Hindered Phenolic Antioxidant | 0.2 | 0.2 | 0.2 | — |
| Melamine | 0.11 | 0.11 | 0.11 | — |

All components beside the glass fiber were mixed together. For the compounding a ZSK 25MC, (Werner&Pfleiderer, Germany) was used (zone temperature 190° C., die temperature about 195° C.). The glass fiber was added using a downstream feeding unit at a suitable position. The screw configuration with kneading elements was chosen so that effective thorough mixing of the components took place during the extrusion as well as an optimal glass fiber length was obtained.

Unless indicated otherwise all determinations have been carried out at room temperature (23° C.).

The testing of the prepared molding compositions was performed according to the following standards:
MVR (190° C.; 2.16 kg): ISO 1133;
Charpy notched impact strength: determined at 23° C. and at −30° C. according to ISO 179-1/1eA (CNI);
Elongation at break, stress at break and tensile modulus have been determined according to ISO 527;
Formaldehyde emission has been determined according to VDA 275 (Verband der Automobilindustrie e.V. (VDA), July 1994);

Portion of terminal OH groups in POM has been determined as described in K. Kawaguchi, E. Masuda, Y. Tajima, Journal of Applied Polymer Science, Vol. 107, 667-673 (2008).

Melting point of polyoxymethylene (POM) has been determined with Differential Scanning Calorimetry (DSC); heating rate 10 K/min according to ISO 11357-1, -2, -3.

The results are listed in the following table.

TABLE 2

| | Units | Sample 1 | Sample 2 | Sample 3 | Sample 4 |
|---|---|---|---|---|---|
| Charpy Notched Impact Strength | | | | | |
| at −30° C. | kJ/m$^2$ | 11 | 7.2 | — | — |
| at 23° C. | kJ/m$^2$ | 11.7 | 7.1 | 12.5 | 8 |
| Tensile Properties | | | | | |
| Elastic Modulus | MPa | 10,654 | 9,705 | 9,200 | 9,500 |
| Fracture Stress | MPa | 169.91 | 130.81 | 150 | 145 |
| Elongation at Break | % | 2.85 | 2.19 | 3.5 | 3 |
| Melt Index 0 Days Storage | | | | | |
| MVR (190° C., 2.16 kg) | cm$^3$/10 min | 1.48 | 2.56 | — | 5 |
| Heat Deflection Temperature | | | | | |
| HDT-A; 1.8 MPa | ° C. | 172 | 170 | 162 | 172 |
| Differential Scanning Calorimetry (DSC) | | | | | |
| 1. Hot, Peak, max | ° C. | 172.55 | 172.74 | — | — |
| 1. Hot, Integral | J/g | 115.8 | 121.3 | — | — |
| Cold, Peak, max. | ° C. | 154.5 | 153.84 | — | — |
| Cold, Integral | J/g | −138.4 | −145.7 | — | — |
| 2. Hot, Peak, max. | ° C. | 175.76 | 175.42 | 166 | 178 |
| 2. Hot, Integral | J/g | 136.6 | 141.9 | — | — |
| FA Emission VDA 275 (G811) | | | | | |
| 7 d/2 mm | mg/kg | 16.56 | 41.79 | — | — |

As shown above, Sample Number 1 made according to the present disclosure demonstrated the best balance of properties. As shown, polymer compositions made according to the present disclosure can have a notched impact strength at 23° C. or at −30° C. of greater than about 9 kJ/m$^2$, such as greater than about 10 kJ/m$^2$, such as even greater than about 11 kJ/m$^2$. The polymer composition can also have an elastic modulus of greater than about 9,500 MPa, such as greater than about 10,000 MPa, such as greater than about 10,500 MPa. The polymer composition can also have a stress at break of greater than about 150 MPa, such as greater than about 160 MPa. The above properties can be obtained while still having a heat deflection temperature of greater than 165° C., such as greater than about 170° C.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:
1. A product comprising a molded article, formed from a polymer composition, the polymer composition comprising:
   a) a polyoxymethylene polymer comprising a polyoxymethylene copolymer containing oxymethylene units and comonomer units, the proportion of comonomer units based on the proportion of oxymethylene units being between about 0.001 mol % and about 0.05 mol %;
b) at least one coupling agent; and
c) at least one reinforcing fiber, and wherein the polymer composition has a heat deflection temperature of greater than 165° C.

2. A product as defined in claim 1, wherein the comonomer units are oxyalkylene units.

3. A product as defined in claim 1, wherein the comonomer units are oxyethylene units.

4. A product as defined in claim 1, wherein the polyoxymethylene polymer has a melt viscosity of from about 6 g/10 min to about 12 g/10 min at 190° C. and at a load of 2.16 kg.

5. A product as defined in claim 1, wherein the polyoxymethylene polymer has the following formula:

—(O—CH2)$x$-(O—C$m$H2$m$)$y$- and wherein
x is a positive integer, preferably from 10 to 10 000,
m is an integer from 2 to 6,
y is an integer from 0 to 10,
the ratio yar/xar is from 0.001 to 0.05
yar being the arithmetic mean of all values y in the polymer mixture; and
xar being the arithmetic mean of all values x in the polymer mixture.

6. A product as defined in claim 1, wherein the polyoxymethylene polymer is present in the polymer composition in an amount from about 40% by weight to about 90% by weight.

7. A product as defined in claim 1, wherein the coupling agent comprises an isocyanate coupling agent, the coupling agent being present in the polymer composition from an amount from about 0,1% to about 5% by weight.

8. A product as defined in claim 1, wherein the polymer composition has a heat deflection temperature of greater than 170'C.

9. A product as defined in claim 1, wherein the polymer composition has a heat deflection temperature of greater than 175° C.

10. A product as defined in claim 1, wherein the polymer composition has a heat deflection temperature from 170° C. to 220° C.

11. A product as defined in claim 1, wherein the reinforcing fiber comprises a continuous-filament fiber.

12. A product as defined in claim 1, wherein the reinforcing fiber comprises glass fiber, the glass fiber being coated with a size composition.

13. A product as defined in claim 1, wherein the reinforcing fiber comprises glass fiber, the glass fiber being present in the polymer composition in an amount from about 5% to about 45% by weight.

14. A product as defined in claim 1, wherein the product comprises an automotive part.

15. A product as defined in claim 1, wherein the product comprises a latch, a lever, a gear, a pivot housing, a wiper arm, a bracket, or a seat rail.

16. A polymer composition comprising:
a) a polyoxymethylene polymer comprising a polyoxymethylene copolymer containing oxymethylene units and comonomer units, the proportion of comonomer units based on the proportion of oxymethylene units being between about 0.001 mol % and about 0.05 mol %;
b) at least one coupling agent; and
c) at least one reinforcing fiber, and wherein the coupling agent couples the reinforcing fiber to the polyoxymethylene polymer; and wherein the polymer composition has a heat deflection temperature of greater than 165° C.

17. A polymer composition as defined in claim 16, wherein the comonomer units are oxyalkylene units.

18. A polymer composition as defined in claim 16, wherein the comonomer units are oxyethylene units.

19. A polymer composition as defined in claim 16, wherein the polyoxymethylene polymer has a melt viscosity of from about 6 g/10 min to about 12 g/10 min at 190° C. and at a load of 2.16 kg.

20. A polymer composition as defined in claim 16, wherein the polyoxymethylene polymer has the following formula:

—(O—CH2)$x$-(O—C$m$H2$m$)$y$- and wherein
x is a positive integer, preferably from 10 to 10 000,
m is an integer from 2 to 6,
y is an integer from 0 to 10,
the ratio yar/xar is from 0.001 to 0.05
yar being the arithmetic mean of all values y in the polymer mixture; and
xar being the arithmetic mean of all values x in the polymer mixture.

21. A polymer composition as defined in claim 16, wherein the polyoxymethylene polymer is present in the polymer composition in an amount from about 40% to about 90% by weight, the coupling agent comprising an isocyanate and being present in the composition in an amount from about 0.1% to about 5% by weight, the reinforcing fibers comprising glass fibers, the glass fibers being present in the composition in an amount from about 5% to about 45% by weight.

22. A polymer composition as defined in claim 21, wherein the glass fibers have been treated with a size composition.

* * * * *